United States Patent [19]

Richard et al.

[11] 4,383,660

[45] May 17, 1983

[54] SINGLE REEL TAPE CARTRIDGE WITH LEADER BLOCK DOOR SEAL

[75] Inventors: Maurice E. Richard; Helfried O. Rinkleib, both of Tucson, Ariz.

[73] Assignee: International Business Machines Corp., Armonk, N.Y.

[21] Appl. No.: 249,266

[22] Filed: Mar. 30, 1981

[51] Int. Cl.³ .......................... G03B 1/04; G11B 15/32
[52] U.S. Cl. ........................................ 242/197; 360/95
[58] Field of Search ..................... 242/195, 197–200; 360/93, 95, 132

[56] References Cited

U.S. PATENT DOCUMENTS 3,188,091 6/1965 Goodell ........................... 242/195 X
3,594,512 7/1971 Castagna ......................... 242/197 X Primary Examiner—Leonard D. Christian
Attorney, Agent, or Firm—R. E. Cummins; J. A. Pershon

[57] ABSTRACT

A magnetic tape cartridge is disclosed in which a length of magnetic tape is wound on a single reel with the free end of the tape permanently connected to a generally rectangular-shaped leader block. The cartridge completely surrounds the reel of magnetic tape except for an opening provided at one corner of the cartridge. This opening permits tape wound on the reel to be unwound as the leader block is moved away from the cartridge, preferably by an automatic threading mechanism. The cartridge is characterized by one corner of the cartridge through which the tape passes being provided with a leader block receiving well in which the bottom of the well surface defines the opening in the cartridge through which the tape moves. Other opposed surfaces of the leader block well are arranged to engage the leading and trailing surfaces of the leader block in a clamping relationship such that the opening in the cartridge is substantially sealed by the leader block to prevent contamination from entering the cartridge when the cartridge is not in use.

10 Claims, 5 Drawing Figures

SINGLE REEL TAPE CARTRIDGE WITH LEADER BLOCK DOOR SEAL

DESCRIPTION

1. Technical Field

This invention relates in general to single reel cartridges for magnetic tape and, in particular, to a cartridge configuration in which a leader block attached to the free end of the tape serves to seal the cartridge when the cartridge is not in use.

2. Background of the Invention

It is desirable to maintain contamination out of a magnetic tape cartridge to enhance the reading and writing of information on the magnetic tape. Contamination arises either from external sources or from internal sources, such as when the tape slides over a guiding surface. It will be recognized that the tape path from the reel to a guiding surface external of the cartridge will vary as a function of the amount of tape wound on the reel and the distance to the first guiding surface. Where the guiding surface is external to the cartridge, the height of the opening through which the tape passes in exiting the cartridge should be sufficient to prevent the tape from rubbing when the reel is either fully wound or fully unwound. The window size in the side of the cartridge to permit tape extraction is, therefore, generally determined by the width of the tape and the height necessary to prevent rubbing. It has been recognized that as the area of the window increases, the chance for external contamination entering the cartridge increases unless some type of sealing arrangement is provided. It has been found that, where a leader block is attached to the free end of the tape generally for the purpose of threading the tape through the tape path, the leader block and cartridge can be constructed and arranged so that the leader block functions as a seal for the section of the cartridge from which the tape exits.

It is, therefore, an object of the present invention to provide a leader block which will seal off the opening in a tape cartridge from which the tape exits.

Another object of the present invention is to provide a tape cartridge in which the section from which the tape exits may be sealed off by a leader block attached to the free end of the tape.

A further object of the present invention is to provide a leader block seal for a magnetic tape cartridge in which the leader block is provided with a boss on its leading edge which cooperates with a portion of the cartridge doorway to hold the block snugly in a closed position.

The foregoing and other objects, features and advantages of the invention will be apparent from the following more particular description of a preferred embodiment of the invention as illustrated in the accompanying drawings.

DESCRIPTION OF THE INVENTION

Figure 1:
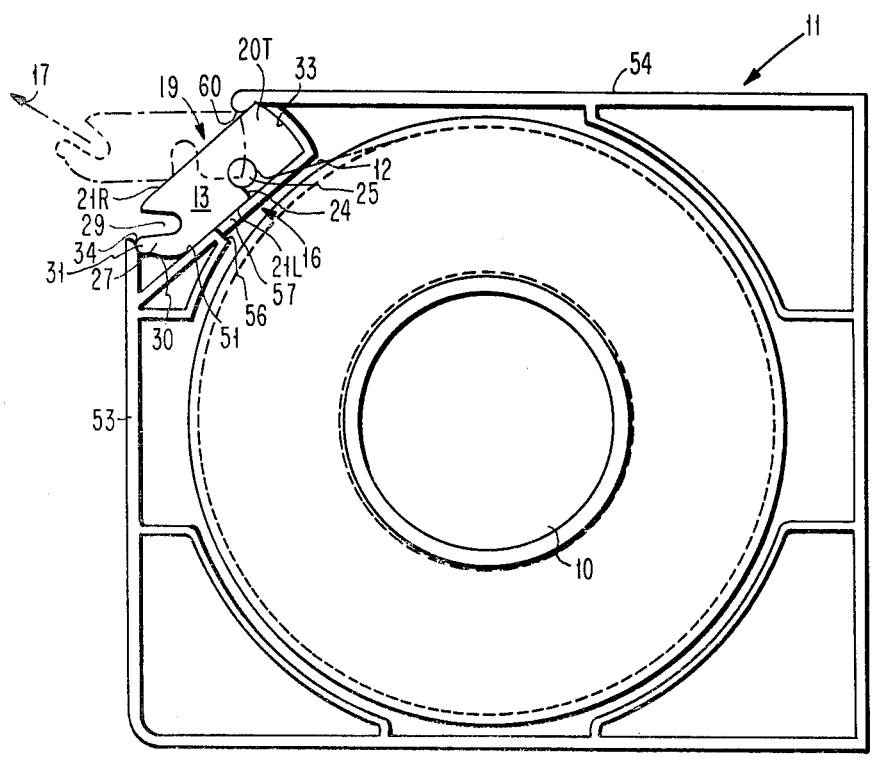
FIG. 1 is a plan view of a single reel magnetic tape cartridge embodying the present invention.

The cartridge shown in FIG. 1 is generally rectangular in shape except for one corner of the cartridge which is angled approximately 45° relative to the adjacent sides to provide a shorter fifth side in which a leader block receiving well 19 is constructed. As shown, the cartridge includes the reel hub 10, the casing 11, the tape 12, and the leader block 13. Tape exits from the cartridge 11 through window opening 16 when the leader block 13 is moved in the direction of arrow 17. Opening 16 is sealed off when the leader block is snapped into the leader block well 19.

Figure 2:
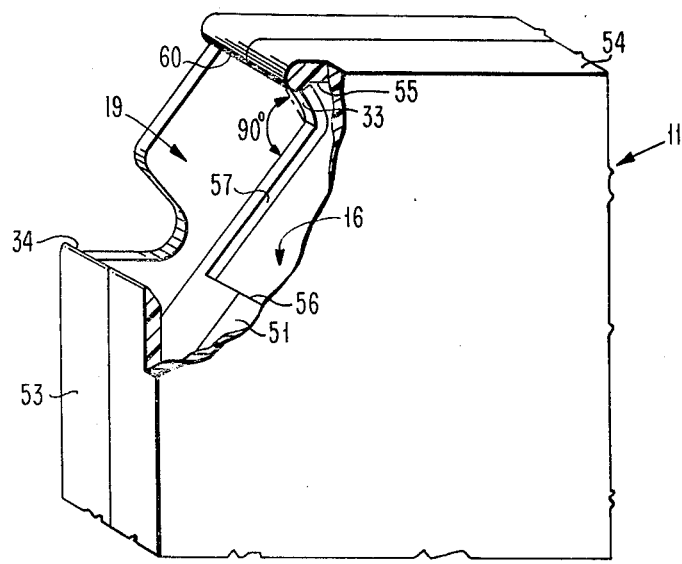
FIG. 2 is a perspective view of the tape cartridge shown in FIG. 1 with a portion of the cartridge broken away to show the window well and sills.

The well 19 as shown in FIGS. 1 and 2 is formed in the one corner of the cartridge angled at 45° and encompassed by portions of a back surface, a front surface, a side 53, and a top surface 54 of the cartridge. The bottom of the well 19 is determined by a bottom surface 51 into which the window opening 16 is formed and framed by edges 56 and 57 and opposing edges (not shown). A side surface 33 and a rounded surface 60 together with an inclined surface 34 completes the box shape of the well 19 that is shaped to approximately match the rectangular block shape of the leader block 13.

The leader block 13 can be viewed generally as a rectangular block provided with two pairs of opposed surfaces. A slot 24 extends normal to a top surface 20T and a bottom surface (not shown) of the leader block 13. A pin 25 is inserted into the slot 24 which together function to attach the tape 12 to the leader block 13 so that the surfaces 21L and 21R of the leader block 13 are generally parallel to the plane of the tape 12 surface and the axis of the tape reel hub 10. One end 27 of leader block 13 is also provided with means for engaging an automatic threading apparatus which may be of the type shown in copending application U.S. Ser. No. 164,732, filed June 30, 1980 and assigned to the assignee of the present invention now U.S. Pat. No. 4,335,858. As shown therein, the leader block is provided with a slot into which a pin on the automatic threading device is positioned. Leader block 13, as shown, is provided with a slot 29 which corresponds generally to the pin receiving slot shown in the copending application. The surface 30, as shown, is slightly cylindrical and is provided with a rounded boss 31 which engages the incline surface 34 of the leader block well 19 disposed in the cartridge. The opposite, or trailing, surface 32 of the leader block 13 may also be slightly cylindrical to mate with the surface 33 of the well 19 which is similarly shaped.

The surface which defines the sills for the window opening 16 for permitting exiting of the tape from the cartridge can also be seen in FIG. 2 which illustrates in perspective one corner of the cartridge in which the leader block well 19 is disposed. As shown in FIG. 2, the window opening 16 is disposed in surface 51 which extends at an angle of approximately 45° between side 53 and the top surface 54 of the cartridge. The bottom of the window opening 16 is defined by edge 56. As seen in FIG. 2, the left edge 57 of the window opening 16 is also visible. The opposite edge is not shown. The top of the window opening 16 is defined by the internal surface edge 55 since surface 33, which extends from the top surface 54 of the cartridge also at an angle of 45°, intersects surface 51. The surfaces 51 and 33, therefore, are disposed at an angle of approximately 90° relative to each other, as shown in FIG. 1. As previously mentioned, surface 33 is slightly rounded to cooperate with the end surface 32 of the leader block 13.

Figure 3A:
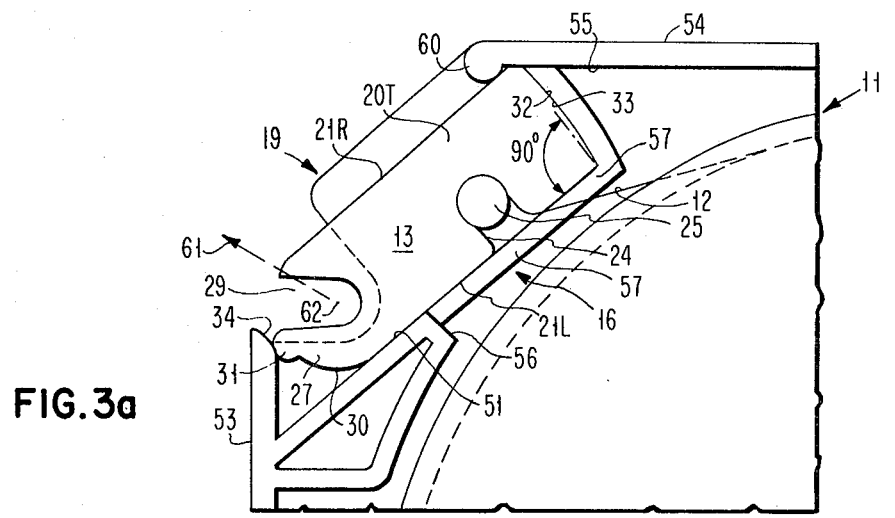
FIGS. 3a through 3c are schematic views illustrating the movement of the leader block between the home position and a position where tape is being extracted.
Figure 3B:
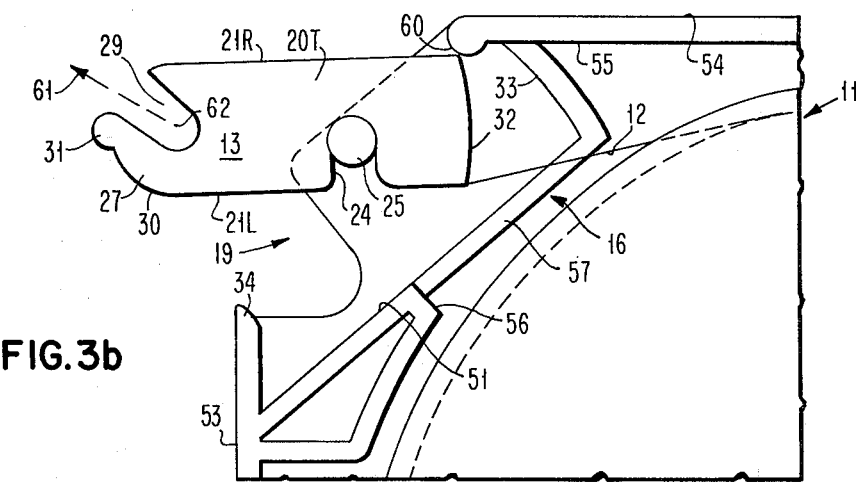
Figure 3C:
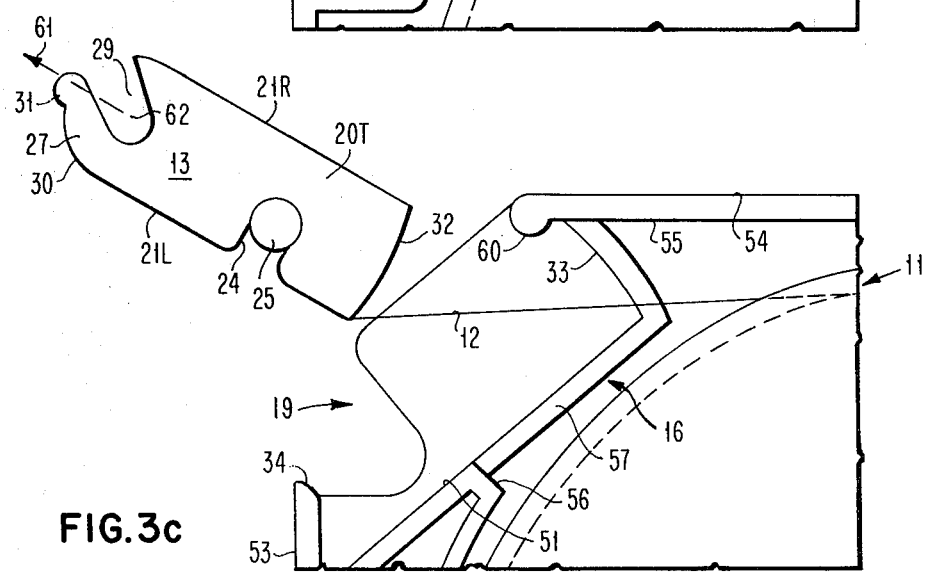

FIGS. 3a through 3c illustrate schematically the movement of the leader block 13 from a home position in the leader block well 19 of the cartridge to a position where the leader block is pulling tape through the opening 16.

FIG. 3a illustrates the leader block snugly positioned in well 19 with the rounded boss 31 engaging surface 34 of side 53 urging the leader block towards the surfaces 33 and 51. This is the home position of the leader block 13.

FIG. 3b illustrates the position of the leader block 13 in which the leader block 13 has been pivoted about the rounded surface 60 of the cartridge as a result of a pulling force acting in the direction of arrow 61 through the imaginary axis 62 in the leader block slot 29. The force may originate as previously mentioned from an automatic threading apparatus of the type described in the copending application or some other suitable prior art means which forms no part of the present invention.

FIG. 3c illustrates the position of the leader block 13 out of the well 19 and moving in a direction which unwinds tape 12 from reel hub 10.

During rewinding, the leader block 13 follows the same path, but in the opposite direction, as the reel hub 10 is rotated in a clockwise direction, as shown in FIG. 1.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new and desire to secure by Letters Patent is:

1. A magnetic tape cartridge comprising:
   a casing;
   a single reel hub mounted for rotation within said casing;
   a length of magnetic tape wound on said hub;
   a generally rectangular shaped leader block having the free end of the magnetic tape connected adjacent to its trailing surface and a leading surface adapted for connection to a device adapted for pulling said leader block and thereby unwinding said magnetic tape from said hub; and
   a leader block receiving well formed in a corner of said casing and including a window opening through which said magnetic tape passes as said leader block is moved away from the casing and said receiving well by the device;
   said well including bottom and side surfaces defining said window opening and further including opposed surfaces forming a part of said casing to which said bottom and side surfaces are attached for engaging the leading and trailing surfaces of said leader block in a clamping relationship such that a side surface and said trailing surface of said leader block cover said window opening to substantially seal said magnetic tape from external contamination.

2. A cartridge as defined in claim 1 in which said magnetic tape is attached to said side of said leader block covering said window opening at the trailing edge of said leader block.

3. A cartridge as defined in claim 1 in which the device adapted for pulling said leader block and unwinding said magnetic tape is an automatic threading device.

4. A cartridge as defined in claim 1 wherein said casing is a generally six-sided, box-like structure except for the corner which includes said leader block receiving well.

5. A cartridge as defined in claim 4 wherein said bottom surface and said side surface of said leader block receiving well are disposed at an angle of approximately 90° relative to each other and each are disposed at an angle of approximately 45° relative to the opposed surfaces which form one pair of said sides of said casing.

6. A cartridge as defined in claim 4 wherein said leading edge of said leader block includes a boss for engaging an inclined surface formed at said leader block receiving well on one side of a pair of sides of said casing which together form the opposed surfaces of said leader block receiving well.

7. A cartridge as defined in claim 4 wherein said trailing edge of said leader block is encompassed by said bottom and side surfaces of said leader block receiving well and the second side of the pair of sides of said casing forming the opposed surfaces of said leader block receiving well and wherein the second side includes a rounded surface about which the trailing edge pivots when said leader block is pulled from said leader block receiving well by the device.

8. A magnetic tape cartridge comprising:
   a casing having a generally four-sided, top and bottom, box-like structure with one corner angled at approximately 45° relative to its adjacent sides to form a shorter fifth side;
   a single reel hub mounted for rotation within said casing;
   a length of magnetic tape wound on said hub;
   a generally rectangular shaped leader block having the free end of the magnetic tape connected to a first side surface adjacent to a trailing surface of said leader block, and adapted at an opposite second side surface to the first side surface at a leading surface of said leader block for connection to a device that is adapted for unwinding said magnetic tape from said hub by pulling said leader block; and
   a leader block receiving well formed at an angle of approximately 45° relative to adjacent sides at said fifth side of said casing and including a window opening through which said magnetic tape passes as said leader block is moved away from the casing and said receiving well, said receiving well including bottom and side surfaces placed at 90° to each other defining said window opening and further including opposed surfaces forming a part of the adjacent sides of said casing at said fifth side to which said bottom and side surfaces are attached for engaging the leading and trailing surfaces of said leader block in a clamping relationship such that said first side surface and said trailing surface of said leader block cover said window opening to substantially seal said magnetic tape from external contamination.

9. A cartridge as defined in claim 8 wherein said leading edge of said leader block includes a boss for engaging an inclined surface formed at said leader block receiving well on one side of the opposed surfaces of the adjacent sides of said casing that form the shorter fifth side.

10. A cartridge as defined in claim 8 wherein said trailing edge of said leader block is encompassed by said bottom and side surfaces of said leader block receiving well and the second side of the opposed surfaces of the adjacent sides of the adjacent sides of said casing that form the shorter fifth side, and wherein the second side includes a rounded surface about which said trailing edge pivots when said leader block is pulled from said leader block receiving well by the device.

* * * * *